Jan. 17, 1933.  G. B. SCHEIBELL  1,894,636
OSCILLATION GENERATOR
Filed July 26, 1930
A Kerr cell controlled light feed back
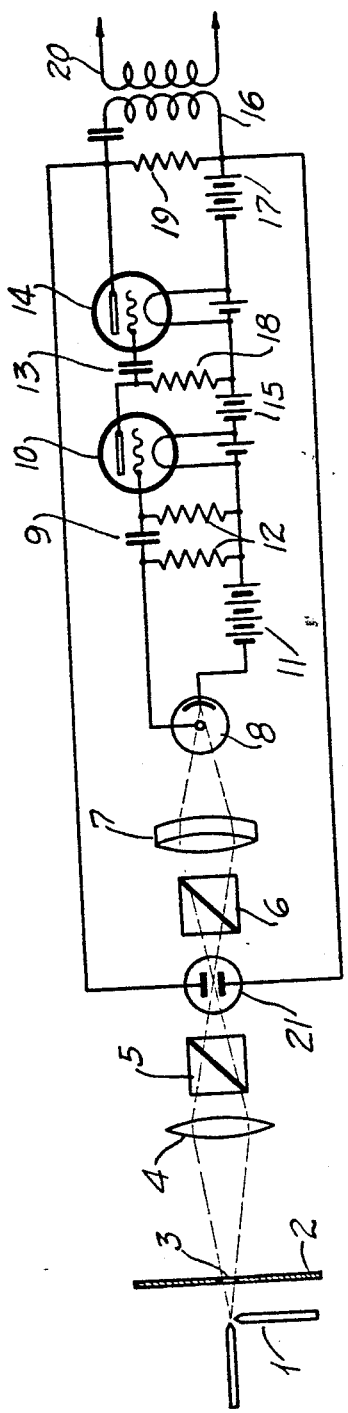
INVENTOR
Gordon Brown Scheibell.
BY
Wm. J. Herdman
ATTORNEY Patented Jan. 17, 1933

1,894,636

UNITED STATES PATENT OFFICE

GORDON BROWN SCHEIBELL, OF NEWARK, NEW JERSEY, ASSIGNOR TO WIRED RADIO, INC., OF NEW YORK, N. Y., A CORPORATION OF DELAWARE

OSCILLATION GENERATOR

Application filed July 26, 1930. Serial No. 471,066.

My invention relates to means for producing electrical oscillations.

One of the objects of my invention consists in providing a photoelectric cell system which will produce sustained oscillations.

A further object comprises producing an oscillation generator in which a photoelectric cell under control of light rays produces an oscillatory current controlling these light rays.

These and other objects will be apparent from the following, reference being had to the accompanying drawing which diagrammatically illustrates one embodiment of my invention.

Referring to the drawing, a source of light rays 1 is positioned near an aperture plate 2. The source of light rays 1 can be an arc or other suitable means for producing irradiations. The light rays from the source 1 are defined by an aperture 3 in the plate 2 to produce a beam of light which is directed by a lens 4 through two light polarizers 5 and 6 and thence through lens 7 upon the cathode of a photoelectric cell 8. The light polarizers 5 and 6 comprise means for polarizing light. Such light polarizers are well known in optics and are usually made of cut tourmaline, calcite and other compositions of crystalline formation. One form of polarizer is known as a Nicol prism. It will be noted that both of these polarizers have the same plane of polarization, which is to say, the light polarized by the polarizer 5 will be normally passed by the polarizer 6.

The anode of the photoelectric cell 8 is connected through a condenser 9 to a space discharge tube 10, while the cathode of the photoelectric cell 8 is connected through a battery 11 to the cathode of the space discharge tube 10. Resistances 12 of suitable value are connected across the anode and cathode of the photoelectric cell 8. The plate of the space discharge tube 10 is connected through condenser 13 to the grid of a space discharge tube 14, while the cathode of the tube 10 is connected through battery 15 to the cathode of the tube 14 as shown. The output from the plate of the tube 14 is directed through an inductance 16. Battery 17 is provided in this plate output circuit. Resistances 18 and 19 of suitable value are provided as shown. A work circuit 20 is inductively coupled to the inductance 16. Such circuit comprises an amplifier for the output of the photoelectric cell 8. It is to be understood, however, that the exact circuit of this amplifier is not a part of my invention, and that any suitable means of amplification can be equally well employed. The present circuit is merely representative of an amplifier found to be satisfactory for the purpose indicated.

A Kerr cell 21 comprises means for rotating the plane of polarization of polarized light, and is also well known in optics. The form of Kerr cell used in the present embodiment of my invention consists of two electrodes immersed in carbon disulphite and contained in a transparent container. The field produced between the two electrodes tends to rotate the plane of polarization of polarized light passing through the carbon disulphide. The output of the amplifier used in my system is connected to the electrodes of the Kerr cell 21 so as to produce a field when light rays are incident upon the cathode of the photoelectric cell 8.

The operation of the oscillation generator of my invention is as follows:

Light from the source 1 is defined into a beam by the aperture 3 and directed through the polarizer 5. This polarizer 5 polarizes the light in one plane. The light is then passed between the electrodes of the Kerr cell 21. The polarizer 6 having the same plane of polarization as the polarizer 5 passes the light through the lens 7 and upon the cathode of the photoelectric cell 8. The light incident upon the cathode of the photoelectric cell 8 produces a photoelectric current which is amplified by the tubes 10 and 14. The output from the tube 14 acts upon the work circuit 20 through inductance 16 and also produces a field between the electrodes of the Kerr cell 21. This field influences the polarized light passing through the Kerr cell so as to revolve the plane of polarization thereof. Since the polarizer 6 has the same plane of polarization as the polarizer 5, it will be evident that light rays emerging from the polarizer 5 in one plane will be obstructed by the polarizer 6 when the plane of polarization is revolved by the Kerr cell 21. Such obstruction of light rays by the polarizer 6 immediately reduces the amount of light incident upon the photoelectric cell 8. Reduction in the amount of light incident upon the photoelectric cell 8 will cause a corresponding diminishment in the photoelectric current. The output of the amplifier will then be reduced so as to correspondingly reduce the intensity of the field of the Kerr cell 21. Reduction of the intensity in the field of the Kerr cell 21 decreases the amount of rotation of the plane of the polarized light thereby allowing more light to pass through the polarizer 6 and fall upon the photoelectric cell 8. The procedure will then be repeated indefinitely to produce a sustained oscillatory current in the work circuit 20. The Kerr cell 21 as well as the photoelectric cell 8 are capable of performing the functions described at relatively high frequencies.

It will now be evident that light rays control the photoelectric cell 8 which in turn controls the light rays to produce oscillating currents. It will, of course, be understood that although I have shown a preferred embodiment of my oscillation generator, changes can be made without departing from the intended scope of my invention. I therefore do not desire to limit myself to the foregoing except insofar as may be pointed out in the appended claims.

What I claim as new and original and desire to secure by Letters Patent of the United States is:

1. An oscillation generator comprising, in combination, a source of light rays, a photosensitive cell under control of said light rays, and an electrostatic light valve interposed between said source of light rays and said photosensitive cell, said light valve being under control of said photosensitive cell.

2. An oscillation generator comprising, a source of light rays, means adapted to polarize said light rays, a photosensitive cell under control of said polarized light rays, an output circuit for said photosensitive cell, and means under control of said photosensitive cell and adapted to rotate the plane of polarization of said light rays.

3. An oscillation generator comprising, a source of light, a photoelectric cell under control of said source of light, an output circuit for said photoelectric cell, two light polarizers interposed between said source of light and said photoelectric cell, and means adapted to revolve the plane of polarization of said light rays, said means being interposed between said light polarizers and under control of said photoelectric cell.

4. An oscillation generator comprising, a source of light rays, a photoelectric cell under control of said light rays, an amplifier connected to said photoelectric cell, two light polarizers interposed between said source of light and said photoelectric cell and having the same plane of polarization, and means interposed between said two polarizers and adapted to rotate the plane of polarized light, said means being connected to said amplifier.

5. A photoelectric system comprising in combination a source of light rays, a photosensitive cell under control of said light rays, a pair of light polarizers each adjusted to have the same plane of polarization located between said source of light rays and said photosensitive cell and electrostatic means under control of said photosensitive cell and located between said light polarizers for rotating the plane of polarization to vary the intensity of light incident on said photosensitive cell.

6. In a photosensitive system, a source of irradiations, photosensitive means under control of said irradiations, and electrostatic means under control of said photosensitive means for controlling said irradiations.

GORDON BROWN SCHEIBELL.

DISCLAIMER 1,894,636.—*Gordon Brown Scheibell*, Newark, N. J. OSCILLATION GENERATOR. Patent dated January 17, 1933. Disclaimer filed April 28, 1936, by the assignee, *Wired Radio, Inc.*

Hereby enters a disclaimer to claims 1, 2, 3, and 6 of said patent.

[*Official Gazette May 19, 1936.*]